June 10, 1969     R. L. COLECHIA     3,449,008
OBJECT HANDLING SYSTEM WITH REMOTE MANUAL CONTROL
Filed June 8, 1967
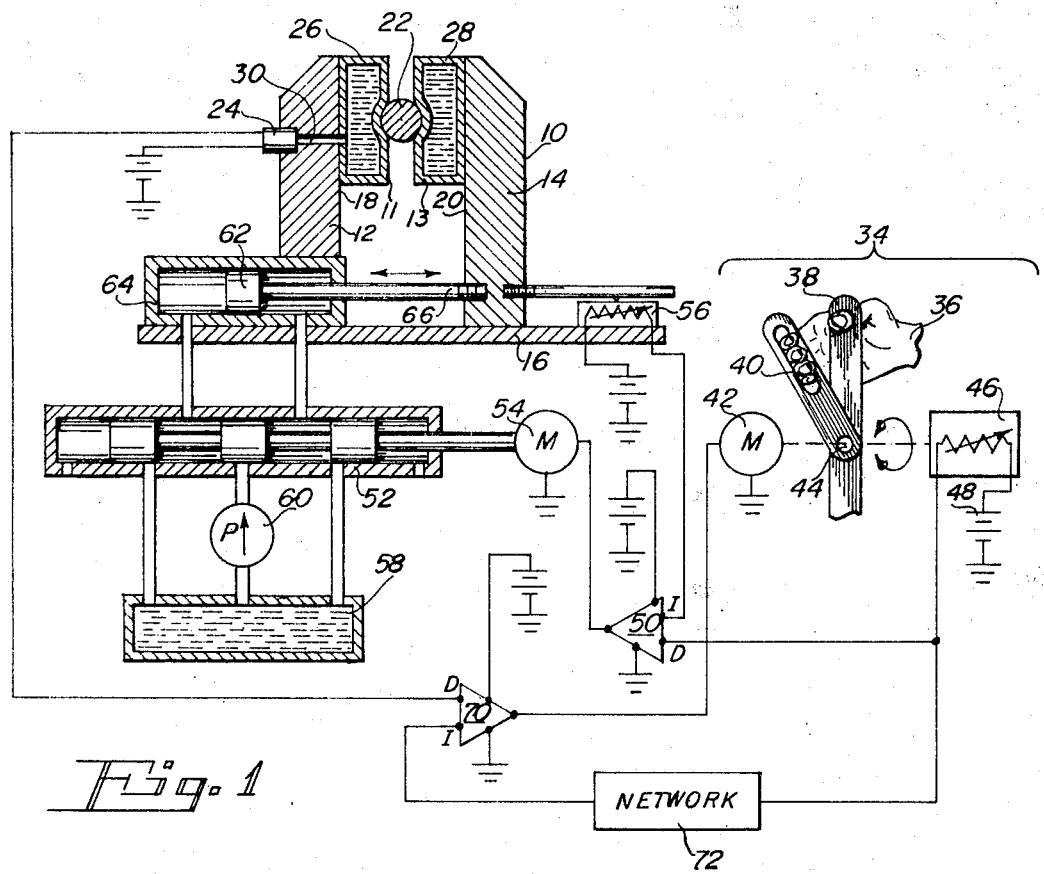
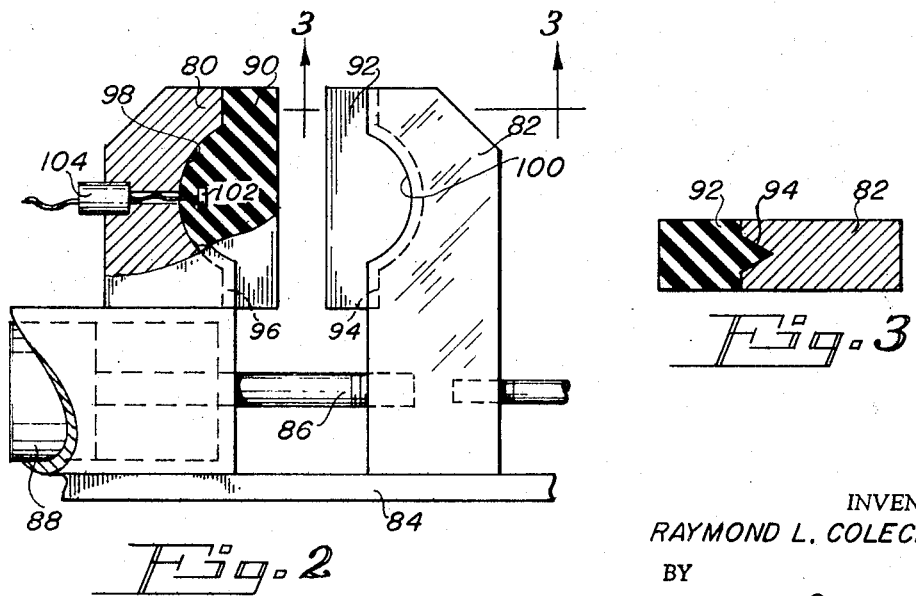
INVENTOR.
RAYMOND L. COLECHIA
BY
William C. Everett

United States Patent Office 3,449,008
Patented June 10, 1969

3,449,008
OBJECT HANDLING SYSTEM WITH REMOTE MANUAL CONTROL
Raymond L. Colechia, Mystic, Conn., assignor to General Dynamics Corporation, New York, N.Y., a corporation of Delaware
Filed June 8, 1967, Ser. No. 644,518
Int. Cl. B66c 1/42; B25b 5/16; F15b 13/14
U.S. Cl. 294—88                           3 Claims

ABSTRACT OF THE DISCLOSURE

A system for handling objects by means of a manipulator operated by a hand actuated control through a servo mechanism. The servo mechanism is operative to position the manipulator in object grasping relation and to provide at the hand control a sensible indication of the reaction force of the object against the manipulator. The servo mechanism itself includes a position responsive feedback system which adjusts the manipulator to a position corresponding to the position of the hand control and another feedback system which applies to the hand control a force proportional to the reaction force being applied by the object against the manipulator. Thus, the operator senses or feels the resistance exerted by the object against movement of the manipulator into the position dictated by the position control system.

---

The present invention relates to object handling systems and particularly to a manipulator system which may be manually controlled from a remote position.

The present invention is especially suitable for use in such applications as underwater exploration and radioactive material handling wherein objects located remotely from a control position are handled by mechanical hands and other articulated mechanisms.

When manual means are used to control a mechanical hand with the aid of a servo mechanism, it is desirable that the response of the object being grasped by the mechanical hand be simulated so that the operator is able to sense the force being applied to the object and can adjust the position of the jaws or the hand accordingly. Prior servo mechanisms for manipulators have responded solely to the position of the manipulator with respect to the object being handled. The operator was relegated to visual observation of the position of the jaws in order to control the force applied by the manipulator. If excess force were to be applied, the object could be damaged. Thus, it has been difficult to remotely handle exceptionally small or delicate articles.

It is therefore an object of the present invention to provide an improved object handling system for handling objects remotely with the aid of a mechanical hand or the like where the actual pressure exerted by the mechanical hand on the object is manifested to the operator at a remote control position.

It is a further object of the present invention to provide an improved manually controlled servo mechanism for handling objects wherein manual control may be exerted both in proportion to a desired position to which the mechanism is to be set and a desired force to be exerted by the mechanism.

It is a still further object of the present invention to provide an improved manipulator which may be remotely controlled manually and which enables the operator to sense the actual amount of resistance exerted by an object being manipulated.

It is a still further object of the present invention to provide an improved manipulator which is better adapted to handle delicate objects than manipulators which are currently available.

Briefly described, a system embodying the present invention includes an object engaging mechanism which is movable by a control signal responsive servo mechanism. The object engaging mechanism may, for example, have a pair of jaws which grasp the object therebetween and which are hydraulically actuated by an electromechanically controlled servo valve which is responsive to the control signal. A transducer is carried by the object engaging mechanism for developing a feedback signal which is responsive to the reaction force of the object against the jaws. The control signal for the servo mechanism may be generated by a manually operated control mechanism which may be manipulated by the operator to various positions; the control signal being dependent upon the position of the control mechanism. A device is coupled to the control mechanism and translates the feedback signal into a force related to the reaction force which opposes the change in position of the control mechanism. This reaction force therefore reveals directly to the operator the resistance of the object to manipulation and permits the operator to adjust the jaws accordingly. Delicate and small objects may therefore be grasped without fear of damaging them.

The invention itself, both as to its organization and method of operation, as well as additional objects and advantages thereof will become more readily apparent from a reading of the following description in connection with the accompanying drawings in which:

FIG. 1 is a schematic diagram of a manipulator system in accordance with the invention;

FIG. 2 is a fragmentary plan view of the manipulator head which contains jaws for grasping an object; the manipulator head in FIG. 2 being provided in accordance with a different embodiment of the invention than the manipulator head shown in FIG. 1; and FIG. 3 is a sectional view through one of the jaws shown in FIG. 2.

Referring more particularly to FIG. 1, there is shown a manually controlled system for opening and closing a manipulator in the form of a mechanical hand 10 which is representative of various object handling devices which may utilize the invention. Typical among such devices is an underwater manipulator which may extend from a submersible vessel and is used for underwater exploration and the like.

The mechanical hand 10 contains a pair of movable jaws 12 and 14 which are located on a support member 16. The article grasping faces 18 and 20 of the jaws carry devices 11 and 13 which has as one of their purposes to transmit the reaction force of an object, shown as a rod 22, against the jaws to a transducer 24 which translates the force into a feedback signal proportional to the reaction force. The transducer 24 may be of the strain gage type (i.e. variable resistance element whose resistance varies in proportion to the amount of force applied thereto). The devices 11 and 13 carried by the jaws 12 and 14 are oil filled containers 26 and 28 of flexible material, such as rubber. The containers may be bonded to the faces 18 and 20. As the jaws 12 and 14 move into article grasping relationship, the pressure applied to the oil in the container 26 increases and is transferred via a conduit 30 to the transducer 24. The resistance of the transducer changes thereby establishing the feedback signal which is proportional to the reaction force applied by the object 22 against the jaws 12 and 14.

The jaws are actuated by a positon responsive servo mechanism of the electrohydraulic type. Another servo mechanism which is principally force responsive and is of the electromechanical type is also provided, so that the operator may be provided the desired sensible manifestation of the action force applied by the object 22 to the jaws 12 and 14.

A control mechanism 34 for the mechanical hand 10 may be disposed remotely therefrom and is operated by the hand 36 of the operator. The mechanism 34 is shown schematically as including a pair of levers 38 and 40, one of which 38 may be fixed, and the other 40 movable. The movable lever 40 is journaled for rotation with a shaft 44 of a servo motor 42. The servo mechanisms are illustrated as DC (direct current) servo mechanisms, in order to simplify the illustration. In that case, the servo motors which are used may be of the solenoid type. It will be appreciated, of course, that alternating current servo mechanisms may be used.

The motor shaft 44 is coupled to a control signal generator in the form of a potentiometer 46. The amplitude of the current which flows through the potentiometer due to the potential of the battery 48 will be proportional to the position of the movable lever 40 of the control mechanism with respect to the fixed lever 38. This control signal is applied to the operational amplifier 50 of the electrohydraulic servo mechanism which operates in response to the signal to position the jaws of the manipulator 10.

This electrohydraulic servo mechanism includes a servo valve 52 which is driven by a servo motor 54 responsive to the error signal developed by the amplifier 50. It will be noted that the amplifier 50 has a direct or non-inverting input (D) and an inverting input (I). The direct input is the control signal and the inverting input is a positional feedback system derived from a potentiometer 56, the resistance presented by which is a function of the relative position of the jaws 12 and 14, as will be hereinafter more fully discussed.

Depending on the position of the servo valve 52, pressure of a hydraulic fluid which is pumped through the valve 52 from a reservoir 58 via pump 60 is applied to different sides of an actuating piston 62. In other words, the differential pressure on opposite sides of the piston 62, as determined by the position of the servo valve under the control of the motor 54, determines the magnitude and direction of the force applied to the movable jaw 14 of the manipulator 10.

A differential pressure transducer may be connected between the chambers on opposite sides of central land of the spool valve 52 in order to absorb transient variations in the differential pressure applied on the opposite side of the piston 62. The piston chamber 64 is fastened as by welding to the support member 16 and the fixed jaw 12 may be fastened to the piston chamber and therefore is not movable with respect to the support member 16. Of course, the entire servo mechanism for the mechanical hand 10 may be mounted on the end of a mechanical arm which extends from the control point and which may be articulated by other servo mechanisms, not shown. The piston rod 66 extends laterally from the movable arm 14 and is coupled to the actuator of the potentiometer 56. Accordingly, the current through the potentiometer will be proportional in amplitude to the position of the movable jaw 14. The positional feeback signal represented by this current is applied to the inverting input of the amplifier 50 to close the loop. Accordingly, the electrohydraulic servo mechanism will tend to move the jaw 14 to a position corresponding to the positon of the lever 40 of the control mechanism 34.

As the jaws grasp the object, the force responsive devices 26 and 28 react. Specifically, the pressure of the fluid in the container 26 increases, thereby increasing the force applied to the transducer 24. The reaction force feedback signal is thereby generated and applied to the direct input of an operational amplifier 70. The output of the amplifier 70 is applied to the motor 42. The motor is polarized, so as to tend to turn the shaft 44 in a direction to cause the lever arms 38 and 40 to move apart from each other in response to a feedback signal resulting from an increase in fluid pressure, thereby indicating to the operator the resistance force which is applied by the object 22 to the jaws. In other words, the servo motor is polarized to apply a restoring force to the movable lever 40. The current through the motor will be proportional to the feedback control signal generated by the transducer 24. Accordingly, the reaction force applied to the control mechanism 34 will give the operator a direct feel of the object 22 against the jaws 12 and 14.

It may be desirable to provide a signal responsive to the position of the jaws to the reaction force servo mechanism. To this end the output of the command signal generating potentiometer 46 may be applied through a shaping network 72 having a desired output current to input current characteristic to the inverting input of the amplifier 70. In this manner, the reactor force servo mechanism will be precluded from overriding the position control servo mechanism. Network 72 also provides a compensation signal to allow for the effect of ambient pressure on transducer 24. This may be provided by an automatic ambient pressure sensor (not shown), for example.

FIGS. 2 and 3 illustrate another embodiment of the mechanical hand manipulator 10. Two jaws, 80 and 82, which are mounted on a support member 84 are provided. A movable one 82 of these jaws is coupled to the piston rod 86 of a piston actuator 88 in a manner similar to that described in connection with FIG. 1. The opposed faces of the jaws 80 and 82 which are adapted to grip the object are lined with a yieldable material, such as rubber. The linings are in the form of inserts 90 and 92 which are bonded in these opposed faces. The opposed faces may be cut with V shaped grooves 94 and 96 for better bonding characteristics. The surfaces may also have portions of radial curvature 98 and 100 milled therein in the region adapted to grasp the object. The insert 90 may have a strain gage sensing element 102 imbedded therein. The element 102 is connected to a junction box 104 in the jaw 80 and thence to the direct input of an amplifier in the reaction force servo mechanism of the apparatus.

From the foregoing description, it will be apparent that there has been provided an improved servo system for manipulators which provides an accurate manifestation to the operator of the reaction force of an object to manipulation. While a representative embodiment of the invention including an electrohydraulic servo mechanism has been described, it will be appreciated that other position responsive servo mechanisms may be used and that various other modifications and variations within the scope of the invention will become apparent to those skilled in the art. Accordingly, the foregoing description should be taken as illustrative and not in any limiting sense.

What is claimed is:
1. A system for manipulating an object comprising
 (a) a pair of jaws supported for relative movement with respect to each other,
 (b) a manually actuable control member,
 (c) a first feedback control servo mechanism responsive to the position of said control member for adjusting said jaws to a position corresponding thereto,
 (d) a pressure transducer device on the inner face of at least one of said jaws responsive to the pressure exerted by said object against said jaws for providing a feedback signal, and

(e) a second servo mechanism responsive to said feedback signal for applying to said control member a reaction force proportional to said pressure.

2. The invention as set forth in claim 1 wherein said device includes a flexible member enclosing a body of liquid.

3. The invention as set forth in claim 1 wherein said device includes a body of solid yieldable material bonded to said one jaw and a strain gage element imbedded in said body.

References Cited

UNITED STATES PATENTS

| 2,992,746 | 7/1961 | Olson et al. | 214—1 |
| 3,241,687 | 3/1966 | Orloff | 214—1 |
| 2,632,574 | 3/1953 | Goertz | 214—1 |

ANDRES H. NIELSEN, *Primary Examiner.*

U.S. Cl. X.R.

91—361; 269—275; 244—77; 214—1